(12) United States Patent
Scherr et al.

(10) Patent No.: US 9,873,400 B2
(45) Date of Patent: Jan. 23, 2018

(54) METHOD FOR PROTECTING A VEHICLE OCCUPANT, AND AIRBAG

(71) Applicant: TRW AUTOMOTIVE GMBH, Alfdorf (DE)

(72) Inventors: Jürgen Scherr, Waldstetten (DE); Marco Wahl, Sulzbach-Laufen (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/913,710

(22) PCT Filed: Sep. 11, 2014

(86) PCT No.: PCT/EP2014/002454
§ 371 (c)(1),
(2) Date: Feb. 23, 2016

(87) PCT Pub. No.: WO2015/036116
PCT Pub. Date: Mar. 19, 2015

(65) Prior Publication Data
US 2016/0200279 A1    Jul. 14, 2016

(30) Foreign Application Priority Data

Sep. 13, 2013 (DE) .......... 10 2013 015 141

(51) Int. Cl.
| | |
|---|---|
| *B60R 21/231* | (2011.01) |
| *B60R 21/233* | (2006.01) |
| *B60R 21/235* | (2006.01) |
| *B60R 21/237* | (2006.01) |
| *B60R 21/00* | (2006.01) |

(52) U.S. Cl.
CPC .......... *B60R 21/233* (2013.01); *B60R 21/235* (2013.01); *B60R 21/237* (2013.01); *B60R 21/23138* (2013.01); *B60R 2021/0006* (2013.01); *B60R 2021/0032* (2013.01); *B60R 2021/0044* (2013.01);
(Continued)

(58) Field of Classification Search
CPC .......... B60R 21/23138; B60R 21/233; B60R 21/235; B60R 21/237; B60R 2021/0006; B60R 2021/0032; B60R 2021/0041; B60R 2021/0044; B60R 2021/23107; B60R 2021/23308; B60R 2021/23509; B60R 2021/23538; B60R 2021/23576
See application file for complete search history.

(56) References Cited

U.S. PATENT DOCUMENTS 5,890,732 A * 4/1999 Nakamura ........ B60R 21/23138
280/729
6,113,135 A   9/2000 Tsutsumi
(Continued)

FOREIGN PATENT DOCUMENTS

JP        2010132072 A  *  6/2010

*Primary Examiner* — Laura Freedman
(74) *Attorney, Agent, or Firm* — Tarolli, Sundheim, Covell & Tummino LLP

(57) ABSTRACT

The invention provides a method of protecting a vehicle occupant (14) during a side impact which includes a side airbag (10) comprising an inflatable thorax section (16) and an inflatable arm lift section (18). Inflation of the arm lift section (18) results in lifting of the arm (24) of the occupant (14). Furthermore an airbag (10) comprising an inflatable thorax section (16) and an inflatable arm lift section (18) is described.

14 Claims, 3 Drawing Sheets

(52) U.S. Cl.
CPC ............... *B60R 2021/23107* (2013.01); *B60R 2021/23509* (2013.01); *B60R 2021/23538* (2013.01)

(56) References Cited

U.S. PATENT DOCUMENTS

| | | | | |
|---|---|---|---|---|
| 7,207,595 B2* | 4/2007 | Kanto | ............... | B60R 21/23138 280/730.2 |
| 7,396,042 B2* | 7/2008 | Mabuchi | ............ | B60R 21/2171 280/730.2 |
| 7,556,287 B2* | 7/2009 | Inoue | ................... | B60R 21/207 280/728.2 |
| 7,946,616 B2* | 5/2011 | Ochiai | ............. | B60R 21/23138 280/730.2 |
| 8,616,579 B2* | 12/2013 | Suzuki | ............. | B60R 21/23138 280/729 |
| 8,651,515 B2* | 2/2014 | Baba | .................... | B60R 21/233 280/729 |
| 8,783,712 B2* | 7/2014 | Fukushima | ....... | B60R 21/23138 280/730.2 |
| 9,027,957 B2* | 5/2015 | Baba | ................ | B60R 21/23138 280/729 |
| 9,039,037 B2* | 5/2015 | Fukushima | ........... | B60R 21/233 280/730.2 |
| 9,085,280 B2* | 7/2015 | Katsumata | ........ | B60R 21/23138 |
| 9,126,560 B2* | 9/2015 | Fujiwara | ............... | B60R 21/207 |
| 9,139,153 B2* | 9/2015 | Deng | ...................... | B60R 21/21 |
| 9,227,590 B2* | 1/2016 | Fujiwara | ........... | B60R 21/23138 |
| 9,254,811 B2* | 2/2016 | Hayashi | ................ | B60R 21/231 |
| 9,296,356 B2* | 3/2016 | Fujiwara | ................ | B60R 21/233 |
| 9,399,440 B2* | 7/2016 | Fujiwara | ............... | B60R 21/2346 |
| 2009/0079171 A1 | 3/2009 | Dix et al. | | |
| 2010/0133796 A1 | 6/2010 | Mizuno | | |
| 2010/0171291 A1 | 7/2010 | Schmidt et al. | | |
| 2012/0013107 A1 | 1/2012 | Shankar | | |
| 2012/0242067 A1 | 9/2012 | Kino et al. | | |

\* cited by examiner

METHOD FOR PROTECTING A VEHICLE OCCUPANT, AND AIRBAG

RELATED APPLICATIONS

This application corresponds to PCT/EF2014/002464, filed Sep. 11, 2014, which claims the benefit of German Application No. 10 2013 015 141.4, filed Sep. 13, 2013, the subject matter of which are incorporated herein by reference in their entirety.

BACKGROUND OF THE INVENTION

The invention relates to a method of protecting a vehicle occupant during side impact as well as to an airbag.

From the state of the art side airbags are known which restrain the head and the thorax of a vehicle occupant, for example. The side airbags known from the state of the art may have two different compartments which are inflated to a different degree in the case of side impact By inflating the side airbag it is achieved that both the head and the thorax of the vehicle occupant are protected during impact.

SUMMARY OF THE INVENTION

It is the object of the invention to further improve the restraint of the occupant.

In accordance with the invention, the object of the invention is achieved by a method of protecting a vehicle occupant in the case of side impact comprising the following steps of:

providing a side airbag including an inflatable thorax section and an inflatable arm lift section, inflating the arm lift section, lifting the arm of the occupant by inflating the arm lift section and inflating the thorax section.

The method according to the invention ensures that the arm of a vehicle occupant is brought outside the thorax area of the vehicle occupant so that the arm cannot contact the thorax of the vehicle occupant. In this way the thorax of the vehicle occupant is relieved in the case of side impact, which renders the load of the thorax occurring during impact homogeneous. The inflating behavior of the side airbag is adjusted so that the arm lift section and the thorax section are inflated in a superimposed sequence so that it is guaranteed that the arm is moved out of the thorax area before the thorax section contacts the thorax of the vehicle occupant.

In particular, the folding of the airbag and the gas conduction within the airbag are designed so that the airbag is inflated starting from the bottom. In this way it is achieved that the arm lift section of the side airbag guides the arm of the vehicle occupant upwards at a very early stage so that the arm is moved outside of the area of interaction with the thorax.

One aspect of the invention provides that the arm lift section and the thorax section are inflated by a joint inflator. The inflating behavior of the side airbag according to the invention is achieved merely by the folding and the gas conduction within the airbag so that one single inflator is sufficient to obtain the desired inflating behavior of the side airbag.

Furthermore, the object of the invention is achieved by an airbag according to the invention comprising an inflatable thorax section and an inflatable arm lift section, with the arm lift section in the inflated condition extending in front of the thorax of the occupant. The arm lift section merely serves for lifting the arm of the vehicle occupant, wherein it extends in front of the vehicle occupant so as not to interact laterally with the thorax of the vehicle occupant. Merely the thorax section of the airbag is assigned to the thorax.

Especially the thorax section is located in the inflated condition as a cushion on the side of the thorax of the vehicle occupant. Hence the thorax section of the side airbag is arranged between the vehicle door and the vehicle occupant so that the thorax of the vehicle occupant is efficiently protected in the case of impact.

Another aspect of the invention provides that the arm lift section starts from the thorax section and is transformed into the same. The arm lift section and the thorax section are in fluid communication so that one single inflator is sufficient for both sections.

Especially, in the inflated condition the arm lift section extends from the front edge of the thorax section laterally in front of the occupant. By the front edge of the thorax section the edge of the thorax section is meant which is close to the front end of the vehicle, for example to the instrument panel of the vehicle. The arm lift section thus extends from the end of the thorax section assigned to the instrument panel in front of the vehicle occupant.

Another aspect of the invention provides that the arm lift section in the inflated condition extends from the front lower edge of the thorax section laterally in front of the occupant. It is achieved in this way that the arm of the vehicle occupant is urged upwards by the inflating arm lift section, as the arm lift section inflates starting from the bottom and acts on the arm on its lower side so as to lift the same upwards.

Moreover the airbag may include a shoulder section end/or a head section for restraining the shoulder and/or the head which extend vertically above the thorax section. With the aid of the additional sections, in the case of side impact the shoulder and the head of the vehicle occupant are efficiently protected. The two sections may also be formed in one piece.

It is especially provided that the airbag is made of one single fabric cut. The arm lift section thus is formed integrally with the thorax section, wherein the inflating behavior of the side airbag according to the invention is obtained by the folding and the sewing of the fabric cut.

According to an aspect of the invention, the cut includes first and second portions which are symmetrical to a first folding axis and which form wall areas of the thorax section as well as a third portion adjacent to the first portion through which a second folding axis extends and which has two halves symmetrical to the second folding axis, wherein the third portion equally forms wall areas of the thorax section. The thorax section includes two wall areas consisting of said three portions, wherein the thorax section is symmetrical by reason of the folding axes.

In particular, a fourth portion is adjacent to the third portion and a fifth portion is adjacent to the second portion, with the fourth and fifth portions being arranged at opposed ends of the wall area of the cut forming the thorax section and forming wall areas of the arm lift section, especially forming the entire arm lift section. The fabric cot thus consists of a total of five portions forming the thorax section and the arm lift section.

Especially between the third and fourth portions a third folding axis is provided and between the second and fifth portions a fourth folding axis is provided. By the various folding axes the fabric out is folded so that the symmetric thorax section and the arm lift section of the side airbag extending asymmetrically to the former can be formed. The arm lift section projects substantially perpendicularly from the thorax section due to the arrangement of the folding axes.

Another aspect of the invention provides that superimposed planar sections which are sewed up at the periphery are formed by folding the cut along the folding axes. Due to the folding of the fabric cut at least the thorax section can be sewed up in the outspread, i.e. flat state. This greatly reduces the manufacturing costs.

The thorax section is especially formed of two congruent superimposed wall areas which are sewed up on the peripheral side, wherein a first wall area is formed by the first portion as well as one half of the third portion and the opposite wall area is formed by the second portion as well as one half of the third portion. The symmetric thorax section is thus primarily formed of the first and second portions symmetrically configured via the first folding axis, wherein moreover the third portion including its second folding axis forms a peripheral area of the thorax section. The third portion is assigned in half to each of the two wall areas of the thorax section due to the folding axis which symmetrically separates the same.

BRIEF DESCRIPTION OF THE DRAWINGS

Further advantages and characteristics will be resulting from the following description and the following drawings which are referred to. In the drawings.

DESCRIPTION

Figure 1:
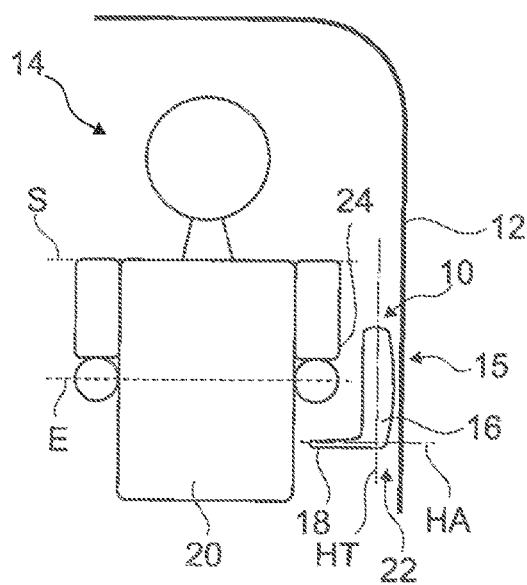
FIG. 1 shows a schematic of the side airbag according to the invention in a vehicle at a first stage immediately after triggering the side airbag.

In FIG. 1 a side airbag 10 according to the invention is shown immediately after triggering. The side airbag 10 is arranged in a vehicle, wherein merely a door area 12 of the vehicle is schematically illustrated. In the vehicle a vehicle occupant 14 is present who is protected by the side airbag 10 in the case of side impact.

The side airbag 10 is arranged in the door area 12 of the vehicle, i.e. between the door lining and the vehicle occupant 14, and includes a main section 15 which in the shown embodiment comprises a thorax section 16 as well as an arm lift section 18.

In the case of side impact, the thorax section 16 protects the vehicle occupant 14 and especially his/her thorax 20. For this purpose, the thorax section 16 is assigned to the side of the thorax 20 which is closer to the door and in the initial condition extends at least over a partial height of the door area 12.

The arm lift section 18 extends starting from a lower end 22 of the thorax section 16 toward the vehicle occupant 14. Accordingly, the arm lift section 18 is configured with its principal orientation HA approximately perpendicularly to the principal orientation HT of the thorax section 16.

In the case of deployment the arm lift section 18 spreads below the door-side arm 24 of the vehicle occupant 14.

For this purpose, the side airbag 10 is arranged in the vehicle such that the arm lift section 18 is located at least in portions below the elbows of the vehicle occupant 14. For the purpose of clarification, in FIG. 1 a broken line E is shown extending at the height of the elbows of the vehicle occupant 14.

The arm lift section 18 is arranged at least in portions below the door-side arm rest which is typically located at the height of the elbow area E of the vehicle occupant 14.

When the arm lift section 18 has reached sufficient volume after ignition of the inflator, the arm 24 is contacted from the bottom by the arm lift section 18 such that it is lifted and is guided upward and forward out of the areas of the thorax 20. It is obtained in this way that the arm 24 is not located in front of the thorax 20 of the vehicle occupant 14 when the latter is restrained.

This is illustrated in FIGS. 2 to 5 in which the further inflating behavior of the side airbag 10 and of its sections as well as the mode of operation thereof is shown.

Figure 2A:
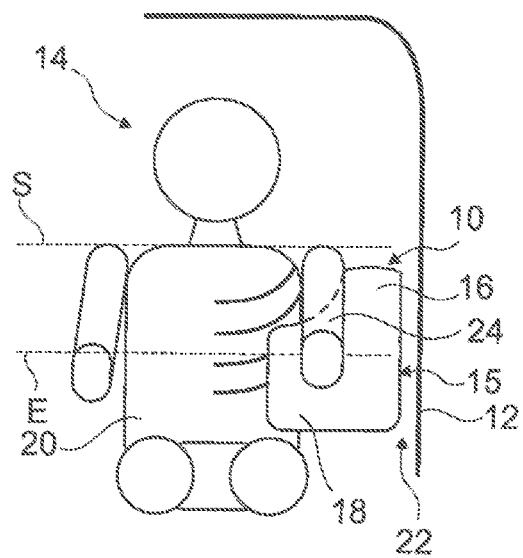
FIG. 2a shows the side airbag from FIG. 1 at a second stage.

In FIG. 2a the side airbag 10 from FIG. 1 is shown when it is almost inflated already. Therefore in FIG. 2a the arm lift section 18 and the thorax section 16 have a larger volume than in FIG. 1.

The thorax section 16 now extends in the state illustrated in FIG. 2a to just below a shoulder area S of the vehicle occupant 14 so that the thorax 20 is protected by the thorax section 16 of the side airbag 10.

In the state illustrated in FIG. 2a the arm lift section 18 is inflated such that it pushes from below against the arm 24 of the vehicle occupant 14.

Figure 2B:
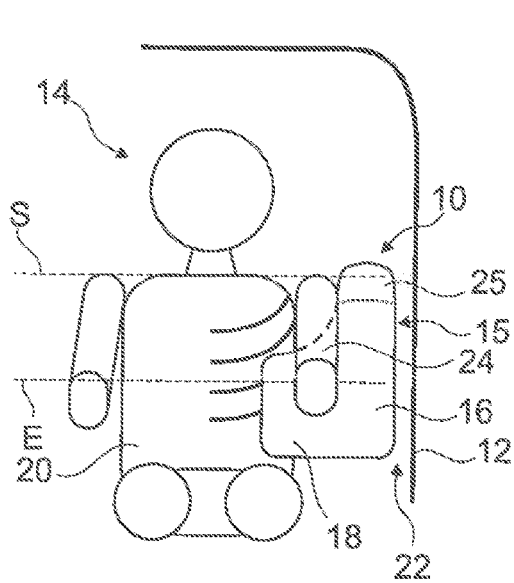
FIG. 2b shows another embodiment of the side airbag at the second stage.

In order to obtain this characteristic inflation behavior of the side airbag 10 the side airbag 10 is inflated starting from the bottom so that the arm lift section 18 is inflated initially toward the vehicle occupant 14 and subsequently the arm lift section 18 as well as later the thorax section 16 will gain volume. This is evident from a comparison of the FIGS. 1 and 2.

in FIG. 2b an alternative embodiment of the side airbag 10 is shown in an almost completely inflated condition.

In the shown embodiment the side airbag 10 includes a main section 15 comprising, apart from the thorax section 16, a shoulder section 25 being upwardly adjacent thereto.

Figure 2C:
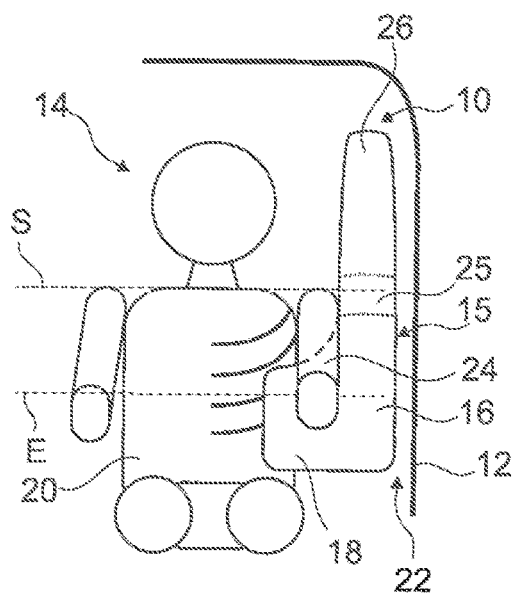
FIG. 2c shows still another embodiment of the side airbag at the second stage.

In the embodiment according to FIG. 2c the main section 15 is even higher and includes an airbag head section 26 as a vertical extension of the thorax section 16 and the shoulder section 25.

The main sections 15 configured in this way according to FIGS. 2b and 2c in the inflated condition extend, due to the shoulder section 25 and the airbag head section 26, over almost the entire height of the door area 12, at least over the entire length of the vehicle occupant 14.

The shoulder section 25 and the airbag head section 26 help protecting the shoulder and, resp., the head of the vehicle occupant 14 during side impact.

In FIG. 2b it is also imaginable that, apart from the airbag including the thorax section 16 and the shoulder section 25, the head will be protected by a separate airbag.

Figure 3:
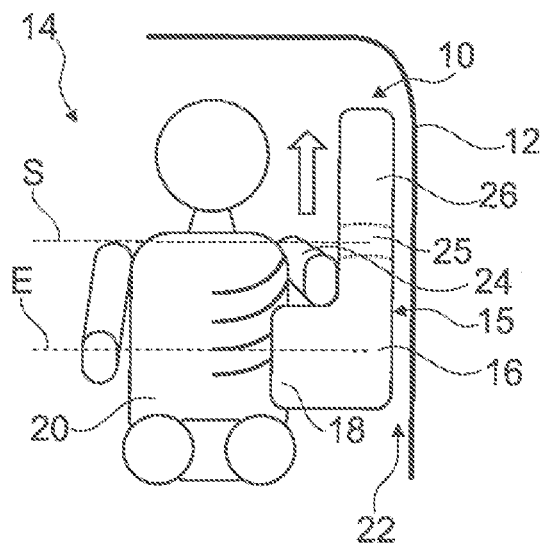
FIG. 3 shows the side airbag from FIGS. 2a to 2c at a third stage.

In FIG. 3 the side airbag 10 of FIGS. 2a to 2c is shown at a later stage of inflation.

The force exerted on the arm 24 by the arm lift section 18 has effected an upward movement of the arm 24 in this case, thus causing the door-side arm 24 to be lifted above the elbow area E and to be moved outside the area of the thorax 20. The individual airbag variants according to FIGS. 2a to 2c are distinguished from each other by broken lines.

Figure 4:
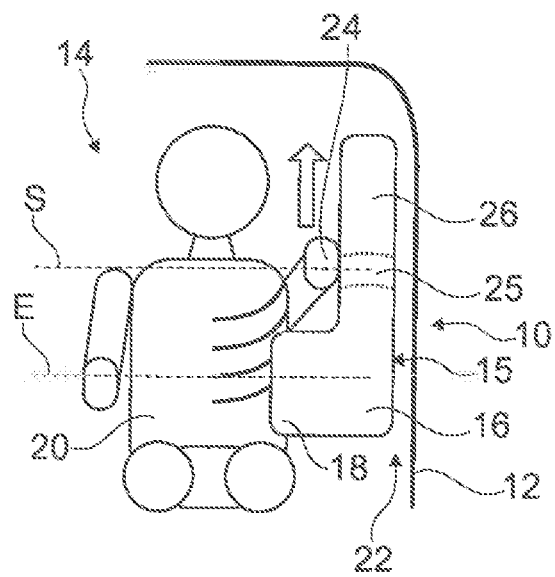
FIG. 4 shows the side airbag from FIGS. 2a to 2c at a fourth stage, when the airbag is completely inflated.

FIG. 4 Illustrates the side airbags 10 of FIGS. 2a to 2c at an even later point in time.

The force exerted on the arm 24 by the arm lift section 18 has pushed the arm 24 upwards such that the arm 24 has moved up to the shoulder area S of the vehicle occupant 14 or, resp., beyond the same.

This ensures that the complete door side of the thorax 20 is exposed for contacting the thorax section 16 and the arm 24 is not located there between.

In the case of lateral acceleration by a side impact the vehicle occupant 14 would immerse, doe to inertia, into the completely inflated cushion-type main section 15 of the side airbag 10. The thorax 20 of the vehicle occupant 14 would immerse into the cushion-type thorax section 16 without getting into contact with the arm 24. This guarantees an improved protection for the vehicle occupant 14, especially for his/her thorax 20, in the case of side impact.

Figure 5:
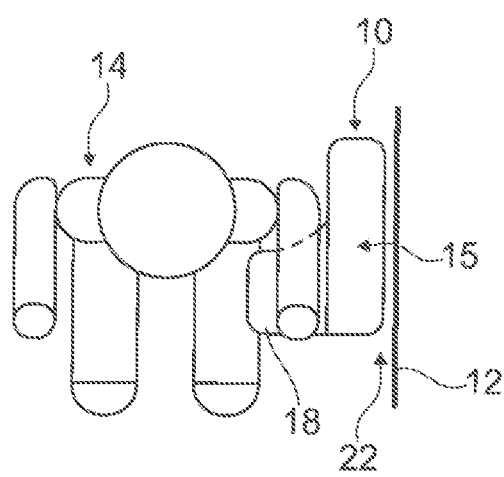
FIG. 5 shows the side airbag from FIG. 4 from a different perspective.

FIG. 5 illustrates the side airbags 10 of the FIGS. 2a to 2c from a different perspective, wherein the vehicle occupant 14 as well as the respective side airbag 10 is shown from above.

It is evident from FIG. 5 that the lower end 22 of the thorax section 16 on which the arm lift section 18 is disposed is the lower front end 22.

The arm lift section 18 extends, starting from the thorax section 16, laterally toward the vehicle occupant 14 and in addition at least partly in front of the thorax 20 of the vehicle occupant 14.

Figure 6:
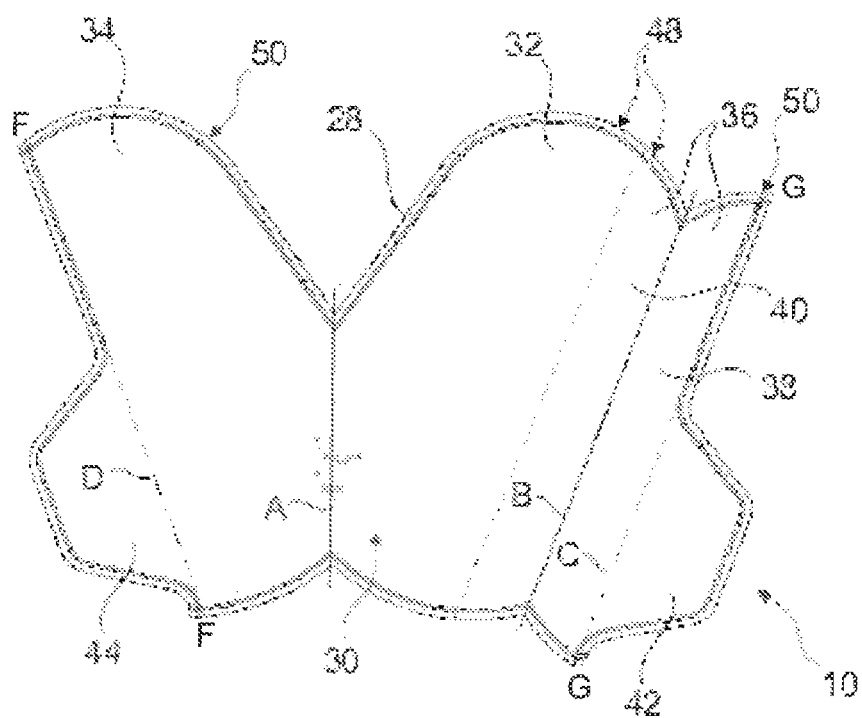
FIG. 6 shows the side airbag out in the outspread state.

In FIG. 6 the cut of the side airbag 10 is illustrated in the outspread condition, the side airbag 10 consisting of one single fabric cut 28. In FIG. 6 the inner surface 30 of the fabric cut 28 is shown.

In the shown embodiment, the fabric cut 28 consists of a total of five portions, a first portion 32 being configured to be symmetrical to a second portion 34 along a first linear folding axis A.

A third portion 36 is connected to the first portion 32, wherein a second folding axis B which divides the third portion 38 into a first half 38 and a second half 40 being symmetrical to each other extends through the center of the third portion 36.

A fourth portion 42 and, resp., a fifth portion 44 which are connected to the third portion 36 and, resp., the second portion 34 via a third folding axis C and, resp., a fourth folding axis D are connected to the third portion 36 as well as the second portion 34.

The fabric cut 28 moreover includes an edge F-G at the periphery of the fifth portion 44 as well as an edge G-G at the periphery of the fourth portion 42.

Figure 7:
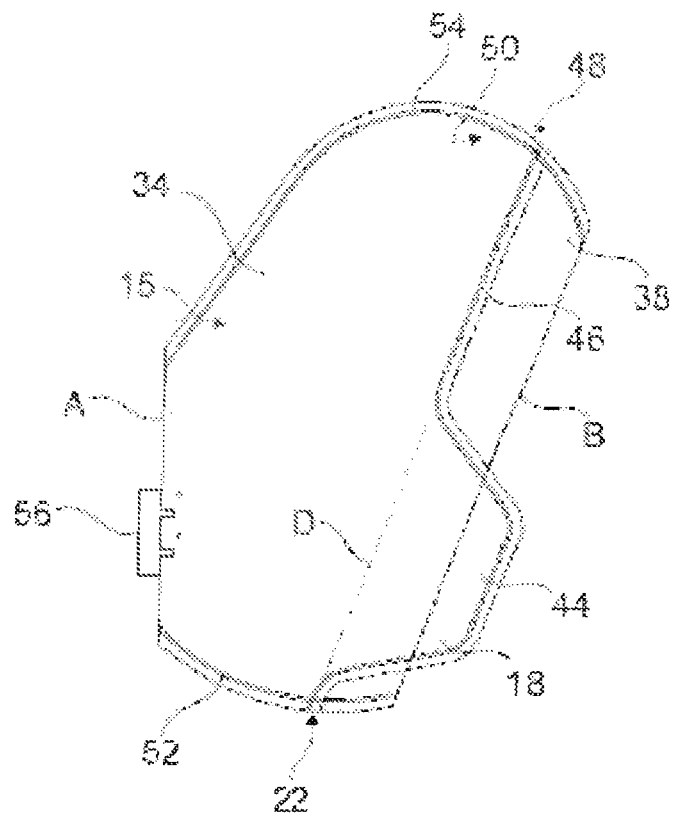
FIG. 7 shows the side airbag from FIG. 6 in the sewed state with the additionally arranged inflator.

In order to arrive at the folded and sewed side airbag 10 as illustrated in FIG. 7, first the two edges F-F, G-G are superposed and sewed up at the periphery so that a first seam 46 is formed (FIG. 7).

The first seam 46 extends along the periphery of the fourth and fifth portions 42, 44 as well as at the transition between the second portion 34 and the first half 38.

The major part of the first seam 46 extends in the vertical direction along the side airbag 10.

Subsequently, the fabric cut 28 is folded along the folding lines A, B, C and D so that the second portion 34 with its inner surface rests on the inner surface of the first portion 32 and the first half 38 of the third portion 36 with its inner surface is superimposed on the equally sized inner surface of the second half 40 of the third portion 36.

Accordingly, the fourth portion 42 and the fifth portion 44 are equally adjacent to each other by their inner surfaces.

This results in a symmetric design of the main section 15.

The main section 15 comprises at least the thorax section 16 of the side airbag 10, the main section 15 consisting of a first wall area 48 and a second wall area 50.

The first wall area 48 is formed of the first portion 32 as well as of the second half 40 of the third portion 36.

The second wall area 50, on the other hand, is formed of the second portion 34 and the first half 38 of the third portion 36.

The second wall area 50 is shown from its outside in FIG. 7.

For forming the finally sewed-up side airbag 10, the side airbag 10 is peripherally sewed up following the afore-described sewing in the vertical direction and the subsequent folding.

For this purpose, the symmetric main section 15 is closed by sewing up the fabric layers along the periphery of the wall areas 48, 50 in a flat condition such that initially a first peripheral seam 52 is formed along the lower edge 22 of the airbag 10 and a second peripheral seam 54 is formed at the end of the side airbag 10 opposed to the lower edge 22.

The two peripheral seams 52, 54 predominantly extend in the horizontal direction.

The first and second wall areas 43, 50 are formed to cover a large surface, wherein they are overlapping so that the symmetric main section 15 can be sewed in the outspread condition of the side airbag 10.

As no continuous seam is provided between the symmetric main section 15 and the arm lift section 18, the arm lift section 18 is in fluid communication with the symmetric main section 15.

Furthermore, an inflator 56 associated to the side airbag 10 in a lower zone is schematically represented in FIG. 7. The inflator 56 is arranged so that the gas outflowing therefrom directly flows into the arm lift section 18 and the latter inflates initially corresponding to the inflation behavior.

Hence, in accordance with the invention it is provided that the arm 24 of a vehicle occupant 14 is moved upwards in the case of an imminent side impact so that the arm 24 gets out of the range of action of the thorax 20 and of the thorax section 16. For this purpose, the side airbag 10 is provided to have an altogether asymmetric contour, wherein the asymmetry is achieved by the arm lift section 18 which laterally projects from the main section 15 in the form of an additional 3D compartment.

The invention claimed is:

1. A method of inflating an airbag to protect a vehicle occupant (14) in the case of a side impact, comprising the steps of:
providing the side airbag (10) with an inflatable thorax section (16) and an inflatable arm lift section (18), wherein the arm lift section (18) is configured to extend from a lower end (22) of the thorax section (16) laterally in front of the occupant (14),
inflating the arm lift section (18) to lift an arm (24) of the occupant, and,
inflating the thorax section (16) subsequent to inflating the arm lift section and lifting the arm of the occupant.

2. The method according to claim 1. wherein folding of the airbag (10) and gas conduction within the airbag (10) are designed so that the airbag (10) is inflated starting from a bottom.

3. The method according to claim 1. wherein the arm lift section (18) and the thorax section (16) are inflated by a joint inflator (56).

4. An airbag (10) comprising an inflatable thorax section (16) and an inflatable arm lift section (18), wherein the arm lift section (18) in an inflated condition is configured to extend from a lower end (22) of the thorax section (16) laterally inboard of the thorax section (16) and in front of a normally seated occupant (14).

5. The airbag (10) according to claim 4, wherein the thorax section (16) in an inflated condition is configured to be located as a cushion on a side of a thorax (20).

6. The airbag (10) according to claim 4, wherein the arm lift section (18) in the inflated condition is configured to extend from a front end (22) of the thorax section (16) laterally front of the occupant (14).

7. The airbag (10) according to claim 4, wherein the airbag (10) includes, vertically above the thorax section (16), a shoulder section (25) and/or a head section (26) configured to restrain a shoulder and/or a head.

8. The airbag (10) according to claim 4, wherein the airbag (10) is made of one single fabric cut (28).

9. The airbag (10) according to claim 8, wherein the cut (28) includes first and second portions (32, 34) which are symmetrical to a first folding axis (A) and form wall areas (48, 50) of the thorax section (16) as well as a third portion (36) adjacent to the first portion (32) through which a second folding axis (B) extends and which has two halves (38, 40) being symmetric to the second folding axis (B), wherein the third portion (36) equally forms the wall areas (48, 50) of the thorax sections (16).

10. The airbag (10) according to claim 9, wherein a fourth portion (42) is adjacent to the third portion (36) and a fifth portion (44) is adjacent to the second portion (34), wherein the fourth and fifth portions (42 44) are arranged at opposed ends of the wall areas (48, 50) of the cut (28) forming the thorax section (16) and form wall areas of the arm lift section (18).

11. The airbag (10) according to claim 10, wherein between the third and fourth portions (36, 42) a third folding axis (C) is provided and between the second and fifth portions (34, 44) a fourth folding axis (D) is provided.

12. The airbag (10) according to claim 11, wherein superimposed planar sections which are sewed together at a periphery are formed by folding the cut (28) along the folding axes (A-D).

13. The airbag (10) according to claim 9, wherein the thorax section (16) is formed of two congruent superimposed wall areas (48, 50) which are sewed up on a periphery, wherein a first wall area (48) is formed by the first portion (32) as well as one half (40) of the third portion (36) and the opposite wall area (50) is formed by the second portion (34) as well as one half (38) of the third portion (36).

14. An airbag (10) comprising an inflatable thorax section (16) and an inflatable arm lift section (18), wherein the arm lift section (18) in an inflated conditon is configured to extend from a lower end (22) of the throax section (16) laterally in front of a normally seated occupant (14), the arm lift section (18) extending beyond a widest portion of the thorax section (16).

* * * * *

UNITED STATES PATENT AND TRADEMARK OFFICE
CERTIFICATE OF CORRECTION

PATENT NO. : 9,873,400 B2
APPLICATION NO. : 14/913710
DATED : January 23, 2018
INVENTOR(S) : Jurgen Scherr et al.

It is certified that error appears in the above-identified patent and that said Letters Patent is hereby corrected as shown below:

In the Claims

Column 7, Line 20 reads "front" should read --in front--

Column 8, Line 3 reads "sections" should read --section--

Column 8, Line 28 reads "conditon" should read --condition--

Signed and Sealed this
Thirty-first Day of July, 2018

Andrei Iancu
*Director of the United States Patent and Trademark Office*